(12) United States Patent
Gjovik et al.

(10) Patent No.: US 12,208,580 B2
(45) Date of Patent: Jan. 28, 2025

(54) MODULAR, DAMPED X, Y-Z THREE-DIMENSIONAL PRINTER CONSTRUCTION

(71) Applicant: Nexa3D Inc., Ventura, CA (US)

(72) Inventors: Erik John Gjovik, Aliso Viejo, CA (US); William Jack MacNeish, III, Santa Ana, CA (US); Blake Ryland Teipel, Pflugerville, TX (US)

(73) Assignee: Nexa3D Inc., Ventura, CA (US)

( * ) Notice: Subject to any disclaimer, the term of this patent is extended or adjusted under 35 U.S.C. 154(b) by 346 days.

(21) Appl. No.: 17/835,572

(22) Filed: Jun. 8, 2022

(65) Prior Publication Data

US 2022/0297375 A1 Sep. 22, 2022

Related U.S. Application Data

(63) Continuation of application No. PCT/US2020/063736, filed on Dec. 8, 2020.

(Continued)

(51) Int. Cl.
*B29C 64/25* (2017.01)
*B29C 64/209* (2017.01)
(Continued)

(52) U.S. Cl.
CPC ............ *B29C 64/25* (2017.08); *B29C 64/209* (2017.08); *B29C 64/232* (2017.08); *B29C 64/245* (2017.08); *B33Y 30/00* (2014.12)

(58) Field of Classification Search
CPC ..... B29C 64/25; B29C 64/209; B29C 64/232; B29C 64/245; B33Y 30/00
See application file for complete search history.

(56) References Cited

U.S. PATENT DOCUMENTS

| 4,529,255 A | 7/1985 | Piotrowski |
| 6,238,115 B1 | 5/2001 | Silverbrook et al. |

(Continued)

FOREIGN PATENT DOCUMENTS

| CN | 101171139 A | 4/2008 |
| CN | 107599398 A | 1/2018 |

(Continued)

OTHER PUBLICATIONS

First Office Action issued Mar. 19, 2024, from the China National Intellectual Property Administration, for Chinese Patent Application No. 2020800961055, 11 pgs.

(Continued)

*Primary Examiner* — Nahida Sultana
*Assistant Examiner* — Mohamed K Ahmed Ali
(74) *Attorney, Agent, or Firm* — Ascenda Law Group, PC

(57) ABSTRACT

A modular three-dimensional printer frame including a z-stage frame adapted to support a build platform, a damper frame connected to the z-stage frame adapted to support a print head, a mount arranged between the z-stage frame and the damper frame, and a damper arranged between the z-stage frame and the damper frame. The damper frame is mounted to the z-stage frame by arranging a first damper between a damper frame to a z-stage frame; arranging a first mount between the damper frame and the z-stage frame; and aligning the damper frame and the z-stage frame with the first mount.

14 Claims, 12 Drawing Sheets

Related U.S. Application Data

(60) Provisional application No. 62/945,399, filed on Dec. 9, 2019.

(51) Int. Cl.
  *B29C 64/232* (2017.01)
  *B29C 64/245* (2017.01)
  *B33Y 30/00* (2015.01)

(56) References Cited

U.S. PATENT DOCUMENTS

| | | |
|---|---|---|
| 2015/0122969 A1 | 5/2015 | Sugita et al. |
| 2015/0147424 A1 | 5/2015 | Bibas |
| 2016/0031160 A1 | 2/2016 | Din et al. |
| 2017/0151704 A1 | 6/2017 | Go et al. |
| 2019/0118467 A1 | 4/2019 | Neboian et al. |

FOREIGN PATENT DOCUMENTS

| | | | |
|---|---|---|---|
| CN | 108602244 A | | 9/2018 |
| CN | 209158959 U | | 7/2019 |
| CN | 209164950 U | * | 7/2019 |
| CN | 209504923 U | * | 10/2019 |
| WO | 2015131833 A1 | | 9/2015 |

OTHER PUBLICATIONS

International Preliminary Report on Patentability issued May 17, 2022, from The International Bureau of WIPO, for International Application No. PCT/US/2020/063736 (filed Dec. 8, 2020), 6 pgs.
Taiwanese Office Action in 110146325, Taiwan Intellectual Property Office (TIPO), mailed Jul. 5, 2022.
European Patent Office. Extended European Search Report for EP Application No. 20897985.6, mailed Nov. 23, 2023, pp. 1-7.
International Search Report and Written Opinion for PCT/US20/63736, International Search Authority, mailed Feb. 26, 2021.
Taiwanese Office Action in 109143462, Taiwan Intellectual Property Office (TIPO), mailed Aug. 4, 2021.

* cited by examiner

MODULAR, DAMPED X, Y-Z THREE-DIMENSIONAL PRINTER CONSTRUCTION

CROSS-REFERENCE TO RELATED APPLICATIONS

This application is a continuation of International Application No. PCT/US20/63736, filed on Dec. 8, 2020, which claims the benefit of U.S. Provisional Application No. 62/945,399 filed on Dec. 9, 2019, the teachings of these applications are incorporated herein by reference in their entirety.

FIELD

The present disclosure is directed to modular, damped X,Y-Z three-dimensional printer construction including, in particular aspects, a dampened three-dimensional printer frame.

BACKGROUND

Extrusion based three-dimensional printers deposit multiple layers of material to form three-dimensional objects. Extrusion based three-dimensional printers providing fused filament fabrication or fused deposition modeling rely on a structural base frame to provide stability and support of the material during printing. Accordingly, the structural base frames are designed with several characteristics in mind, including, e.g., stiffness to maintain location accuracy, vibration isolation of the x-y platform relative to the z-platform, alignment of the x-y stage to the z-stage platform, design flexibility of modular Z-heights, x-y positional accuracy, simple installation, ease of production, accurate assembly of motion system (i.e., printer head and z-stage platform), relatively low system costs and overall performance and accuracy.

While current three-dimensional printers are designed with these characteristics in mind, many of these characteristics contradict one another. For example, it may be difficult to deliver both stiffness to maintain location accuracy, and vibration isolation of the x-y platform relative to the z-platform. It may further be difficult to deliver alignment of the x-y stage to the z-stage platform and design flexibility of modular Z-heights. It may also be difficult to deliver x-y positional accuracy and simple installation. It may yet further be difficult to deliver ease of production, accurate assembly of motion system, i.e., printer head and z-stage platform. It may yet further be difficult to deliver relatively low system costs and overall performance and accuracy. As three-dimensional printers print with higher speeds generating greater forces and loads on the base frame, many of these characteristics may become more difficult to achieve.

Thus, there is still room for systems that provide and improve upon these design features in three-dimensional printers.

SUMMARY

According to several aspects, the present disclosure is directed to a modular three-dimensional printer frame. The modular three-dimensional printer frame includes a z-stage frame adapted to support a build platform, a damper frame connected to the z-stage frame adapted to support a print head, a mount arranged between the z-stage frame and the damper frame, and a damper arranged between the z-stage frame and the damper frame.

In further aspects, the damper frame defines a base and the damper frame further includes at least two rails mounted to the base and a print head carriage received by the rails.

In additional aspects, the modular three-dimensional printer frame further includes a second mount and a third mount arranged between the z-stage frame and the damper frame; and a second damper arranged between the damper frame and the z-stage frame.

In further aspects, the first mount, the second mount, and the third mount are arranged between the z-stage frame and the damper frame in a triangular pattern.

In further aspects, the z-stage frame defines a first opposing side, a second opposing side, a rear side spanning the first opposing side and the second opposing side, a first corner defined by the first opposing side and the rear side, and a second corner defined by the rear side and the second opposing side, including the first damper located at the first corner and the second damper located at the second corner.

In further aspects, the first mount is positioned between the first damper and the second damper, the second mount is positioned at a third corner opposing the first corner of the first opposing side, and a second mount is positioned at a fourth corner opposing the second corner of the second opposing side.

In further aspects, the first mount is one of aluminum and a polymer material.

In further aspects, the damper frame includes a first machined surface forming a relief and the first mount is received in the relief.

In further aspects, the z-stage frame includes a second machined surface forming a relief and the first mount is received in the relief.

In further aspects, the first damper includes a first damping pad located between the damper frame and the z-stage frame.

In further aspects, the mount exhibits a first hardness and the first damping pad exhibits a second hardness wherein the first hardness is greater than the second hardness.

In further aspects, the z-stage frame includes a third machined surface that form a relief and receives the first damping pad.

In further aspects, the first damper further includes a second damping pad located between the damper frame and a backing plate.

In further aspects, the first and second damping pads are formed of synthetic rubber.

In further aspects, the backing plate, the first damping pad, and the second damping pad are secured to the damper frame and the z-stage frame with a plurality of mechanical fasteners.

In further aspects, the damper frame includes a fourth machined surface forming a relief and receives the second damping pad.

According to several aspects, a method of mounting a damper frame to a z-stage frame, includes arranging a first damper between a damper frame to a z-stage frame; arranging a first mount between the damper frame and the z-stage frame; and aligning the damper frame and the z-stage frame with the first mount.

In additional aspects, the method includes securing the damper frame and the first mount to the z-stage frame with a plurality of mount mechanical fasteners and securing the first damper to the damper frame with a plurality of damper mechanical fasteners.

In further aspects, the damper frame defines a base and the method further includes forming a plurality of machined surfaces in the base for receiving the first damper and the first mount.

In further aspects, a plurality of openings are formed for receiving the plurality of damper mechanical fasteners and the plurality of mount mechanical fasteners.

According to several additional aspects, the present disclosure is directed to a modular three-dimensional printer. The three-dimensional printer includes a build platform, a z-stage frame supporting the build platform, a print head, a damper frame supporting the print head, wherein the damper frame is connected to the z-stage frame by a mount arranged between the z-stage frame and the damper frame and a damper arranged between the z-stage frame and the damper frame.

According to several yet additional aspects, the present disclosure relates to a modular three-dimensional printer having a side and a filament cart connected to the side of the three-dimensional printer.

According to several further aspects, the present disclosure relates to a modular three-dimensional printer system. The modular three-dimensional printer system includes at least two three-dimensional printers, a bore defined in each of the three-dimensional printers, and a dowel that is received in the bores between the three-dimensional printers connecting the three-dimensional printers together.

BRIEF DESCRIPTION OF THE DRAWINGS

The drawings described herein are for illustration purposes only and are not intended to limit the scope of the present disclosure in any way.

DETAILED DESCRIPTION

The present disclosure is directed to modular, damped X,Y-Z three-dimensional printer construction including, in particular aspects, a dampened three-dimensional printer frame. The present disclosure provides a three-dimensional printer as well as a three-dimensional printer frame, including a damped frame connected to a z-stage frame.

Figure 1A:
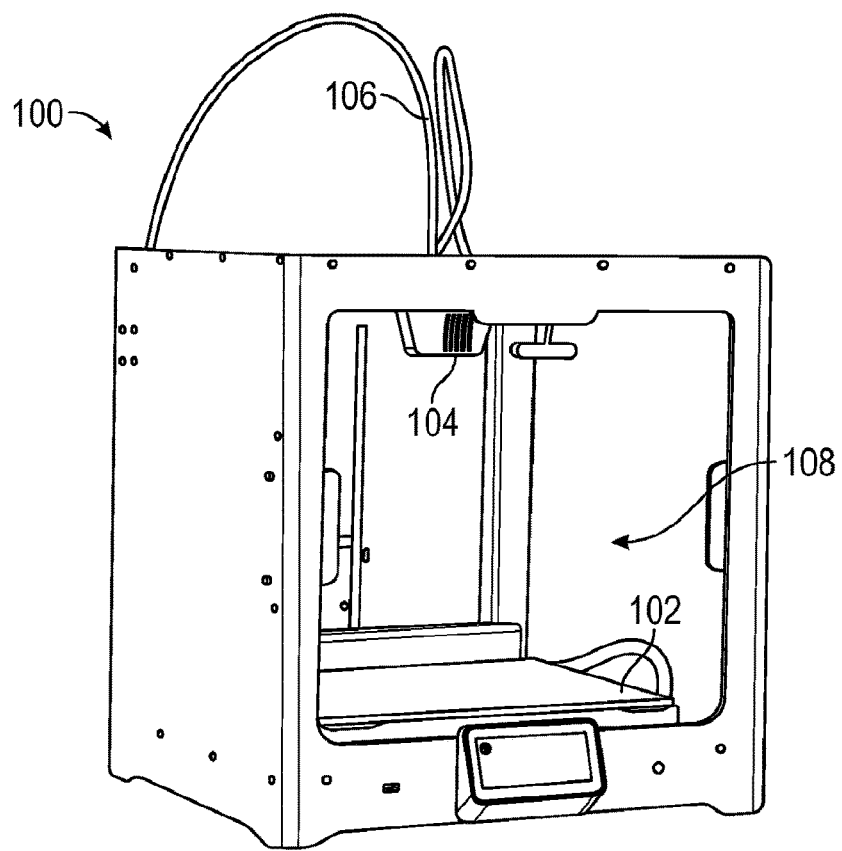
FIG. 1A illustrates an example of a three-dimensional printer.
Figure 1B:
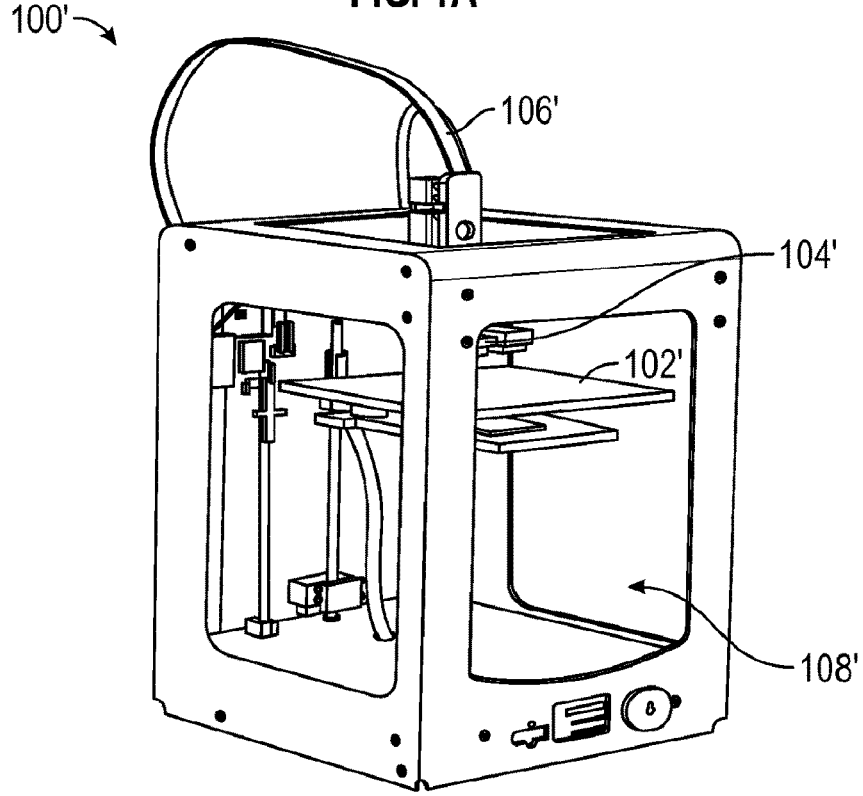
FIG. 1B illustrates an example of a three-dimensional printer.
Figure 2:
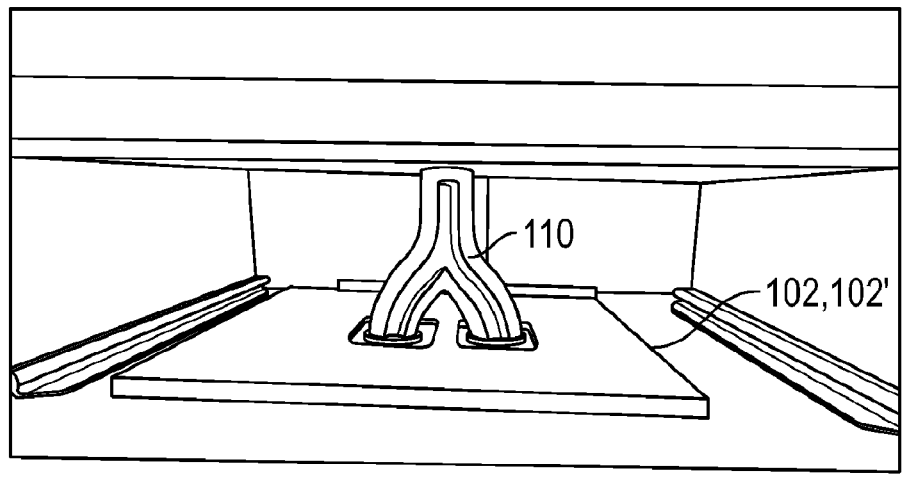
FIG. 2 illustrates an example of a three-dimensionally printed object, in accordance with an aspect of the present disclosure.

As illustrated in FIGS. 1a and 1b, three-dimensional printers 100, 100' generally include an x-y build platform 102, 102', which moves up and down in the z-direction, and a print head 104, 104' for depositing material, such as a filament 106, 106', onto the build platform 102, 102' in multiple successive layers to form a three-dimensionally printed object 110, as illustrated in FIG. 2. As material is deposited, the build platform 102, 102' moves to accommodate the deposited layers of material. The filament 106, 106' is often delivered from a source, such as a filament holder, outside of the build volume 108, 108'. The printers illustrated in FIGS. 1A and 1B include a unitary frame, wherein the entire frame supporting the printer is relatively rigid.

Figure 3A:
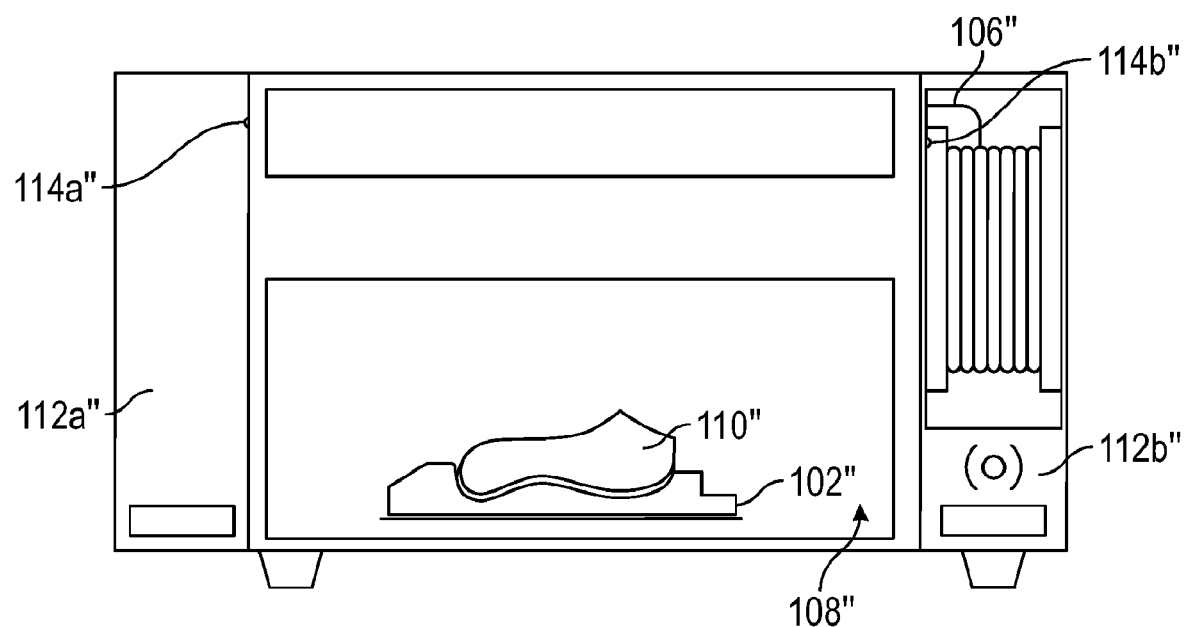
FIG. 3A illustrates an example of a three-dimensional printer, in accordance with an aspect of the present disclosure.
Figure 3B:
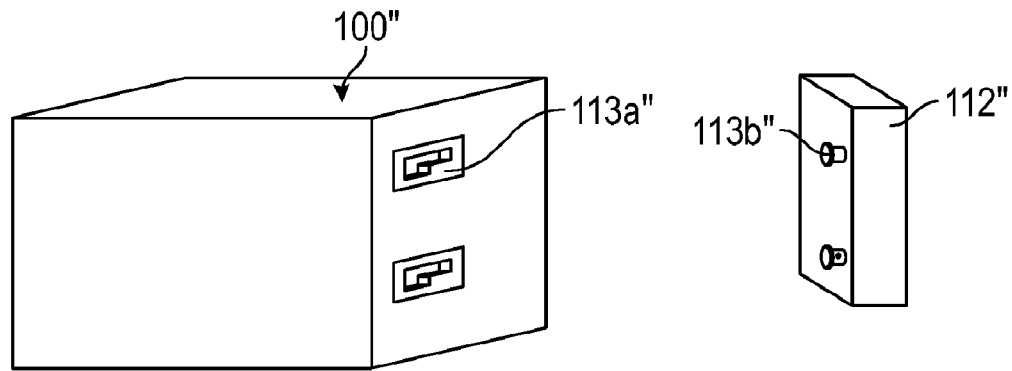
FIG. 3B illustrates an example of mechanical fasteners for securing a filament cart to the side of a three-dimensional printer, in accordance with an aspect of the present disclosure.

FIG. 3A illustrates another configuration of a three-dimensional printer 100", including filament cart 112a", 112b" (collectively referred to as filament carts 112") connected to each side 114a", 114b" of the printer for feeding filament 106" into the three-dimensional printer 100". FIG. 3A also illustrates a three-dimensional printed object 110" on a contoured build platform 102", which supports various contours in the three-dimensional printed object 110" during printing. In aspects, the filament carts 112" are release-ably connected to the three-dimensional printers 100", allowing the filament carts 112" to be removed from the three-dimensional printer 100" and interchanged with other carts. The filament carts 112" may be coupled using interlocking connectors, an aspect of which is illustrated in FIG. 3B. In the illustrated aspect, the interlocking connectors include keyhole mounts 113a" on the printer 100" and mating keys 113b" extending from the filament cart 112". It may be appreciated that the mating keys 113b" may be located on the printer 100" and the keyhole mounts 113a" on the filament cart 112". Alternatively, other interlocking connectors may be used, including nuts and bolts (not illustrated). While filament carts 112" are illustrated as being positioned on either side of the three-dimensional printer 100" in FIG. 3A, it may be appreciated that only one filament cart 112", such as either filament cart 112a" or filament cart 112b", may be present such as illustrated in FIG. 3B.

Figure 4A:
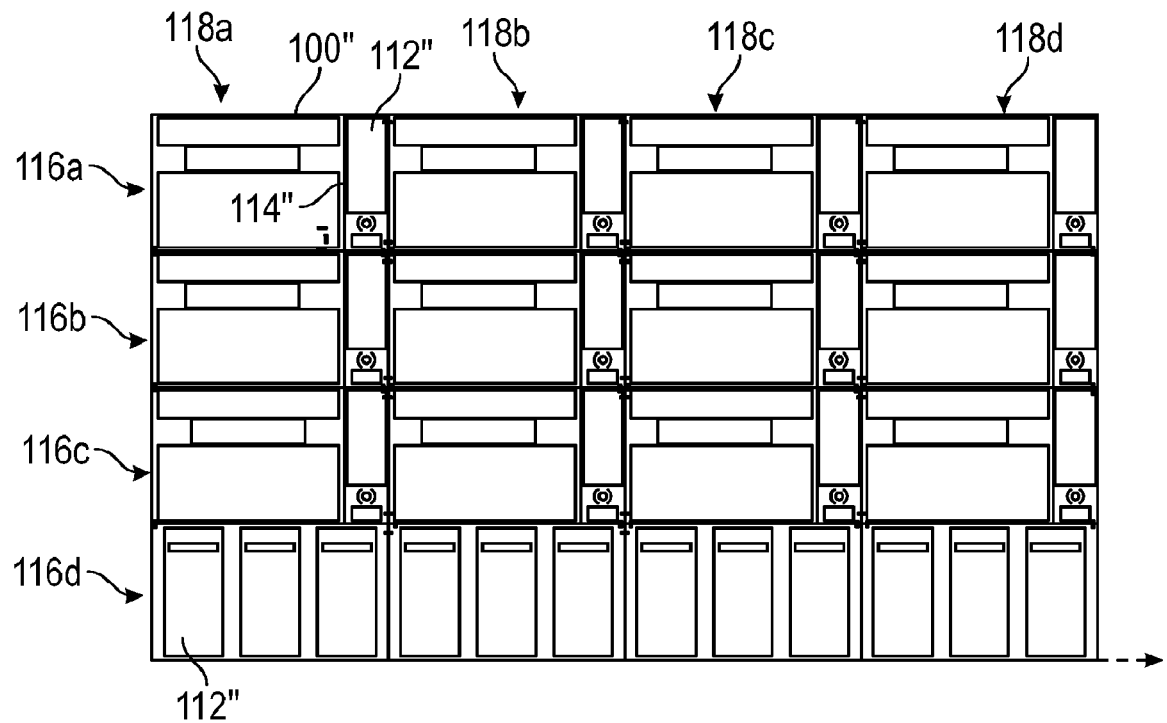
FIG. 4A illustrates a plurality of three-dimensional printers stacked together, in accordance with an aspect of the present disclosure.
Figure 4B:
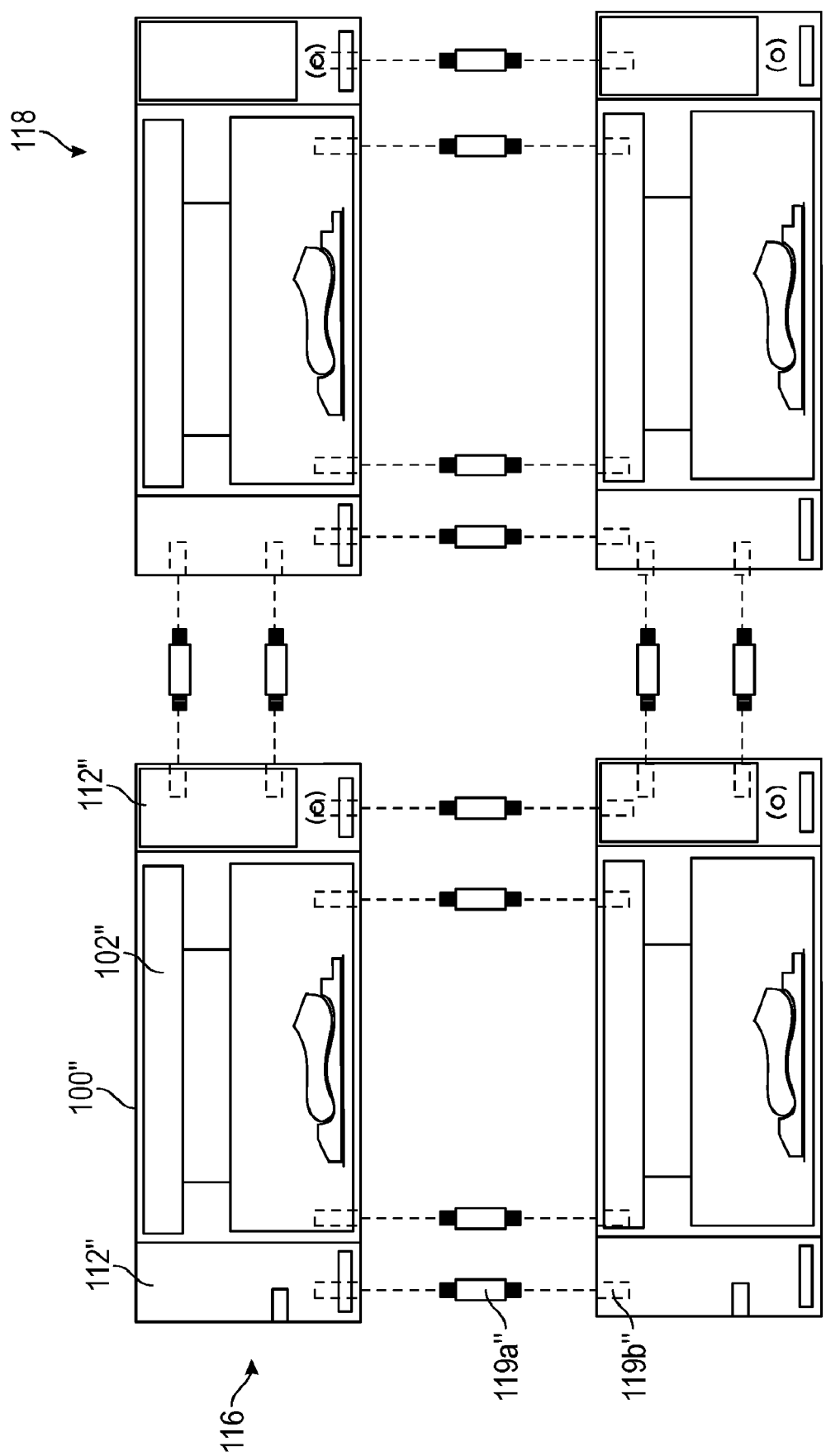
FIG. 4B illustrates the use of dowel pins as fasteners for securing three-dimensional printers together, in accordance with an aspect of the present disclosure.

FIG. 4A illustrates a further configuration wherein a plurality of three-dimensional printers 100" are stacked in rows 116a, 116b, 116c (collectively referred to herein as rows 116) and columns 118a, 118b, 118c, 118d (collectively referred to herein as columns 118). In this aspect, the printers 100" are stacked on top of a number of filament carts 112" stacked in a row 116*d*. In addition, each printer 100" is connected to a filament cart 112" at its side 114'. It may be appreciated that either the base mounted or side mounted filament carts 112" may be omitted. While three rows 116 and four columns 118 are illustrated, it may be appreciated that the three-dimensional printers may be stacked in a single row 116, or stacked in two or more rows and up to, e.g., 10 or more rows. Further, it may be appreciated that the three-dimensional printers may be stacked in a single column 118, or stacked in two or more columns and up to, e.g., 10 or more columns. The three-dimensional printers 100" are connected to each other using, e.g., dowel pins 119*a*" that are received in bores 119*b*" as illustrated in FIG. 4B. In alternative aspects, the printers 100" are connected into columns 118 using dowel pins and connected in rows using the arrangement illustrated in FIG. 3B using keyhole mounts 113*a*" and mating keys 113*b*" Further, as illustrated in FIG. 4B, a stack of build platforms 102" may be provided in the upper portion of the three-dimensional printer 100" which may allow for relatively continuous printing.

Figure 5:
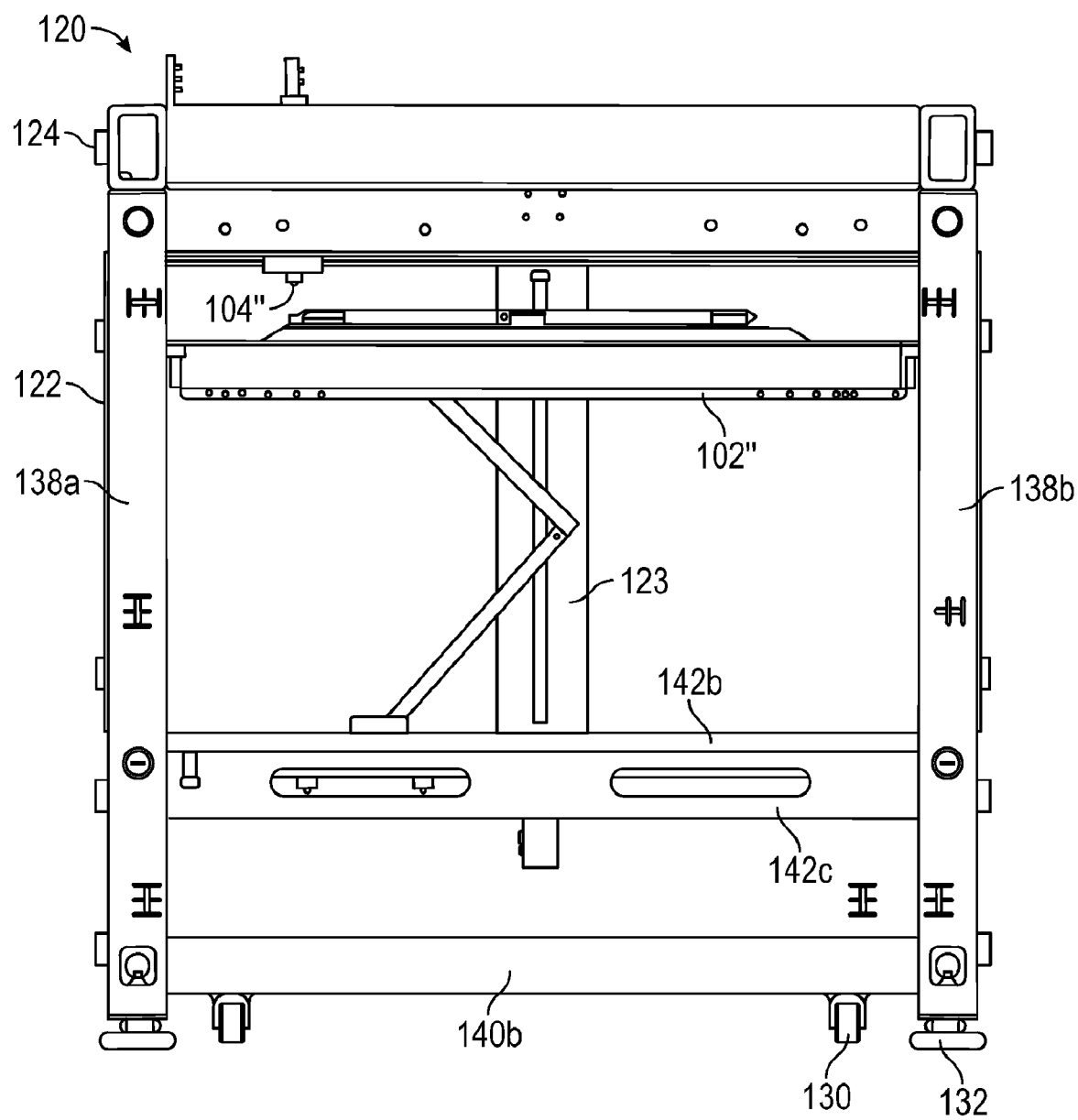
FIG. 5 illustrates a three-dimensional printer frame including a z-stage frame and a damper frame, in accordance with an aspect of the present disclosure.

As with the three-dimensional printers 100, 100' illustrated in FIGS. 1A and 1B, the three-dimensional printer 100" illustrated in FIGS. 3A through 4B is generally built around a printer frame. In aspects, shown in FIGS. 5 and 6, a modular, damped printer frame 120 is provided, which includes a z-stage frame 122 as well as a damper frame 124. The printer frame 120 is adapted to support the build platform 102" and print head 104". In aspects, the z-stage frame 122 is adapted to support the build platform 102", such that the build platform 102" moves up and down in the z-axis along a z-axis rail 123. The damper frame 124 is adapted to support the print head 104" and the print head 104" is configured to move in the x and y directions along rails supported by the damper frame 124 (illustrated further herein).

In aspects, where the three-dimensional printer 100" is unstacked, or stacked printers 100" are small enough to be mobile, the z-stage frame 122 is carried on wheels 130 and includes adjustable feet 132. In aspects, the wheels 130 are present along one side 134 of the three-dimensional printer 100" and in other aspects, the wheels are present along opposing sides 134, 136 of the three-dimensional printer 100 (see FIG. 6). The adjustable feet 132 adjust the height of each corner of the three-dimensional printer 100" allowing for leveling of the three-dimensional printer 100".

Figure 6:
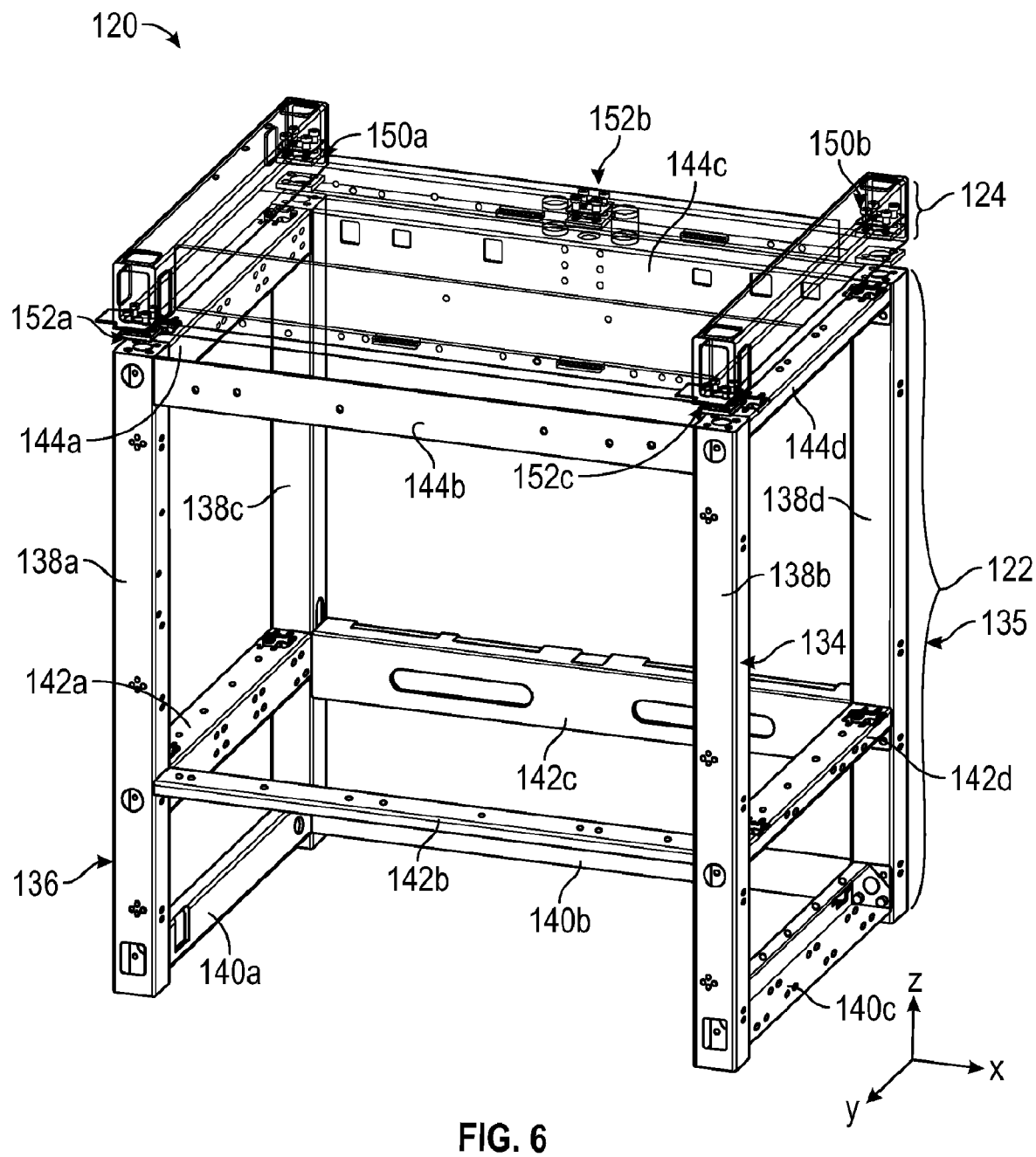
FIG. 6 illustrates a three-dimensional printer frame including a z-stage frame, dampers and mounts as well as the damper frame illustrated in transparent, in accordance with an aspect of the present disclosure.

In aspects, and as illustrated in FIG. 6, the z-stage frame 122 includes four vertical beams 138*a*, 138*b*, 138*c*, 138*d* (collectively referred to herein as vertical beams 138), three horizontal base cross beams 140*a*, 140*b*, 140*c* (collectively referred to herein as base beams 140) connecting the four vertical beams 138, four horizontal lower cross beams 142*a*, 142*b*, 142*c*, 142*d* (collectively referred to herein as lower cross beams 142) connecting the four vertical beams 138, and four horizontal top cross beams 144*a*, 144*b*, 144*c*, 144*d*, (collectively referred to herein as top cross beams 144) connecting the four vertical beams 138. It should be appreciated that, in aspects, four horizontal base cross beams 140 may be present or less than three horizontal base cross beams 140 may be present. It should further be appreciated that, in aspects, less than four horizontal base cross beams 142 or four horizontal upper cross beams 144 may be present, such as three or two. In aspects, the z-stage frame vertical beams 138, horizontal base cross beams 140, horizontal lower cross beams 142 and horizontal top cross beams 144 are formed from sheet steel.

Figure 7A:
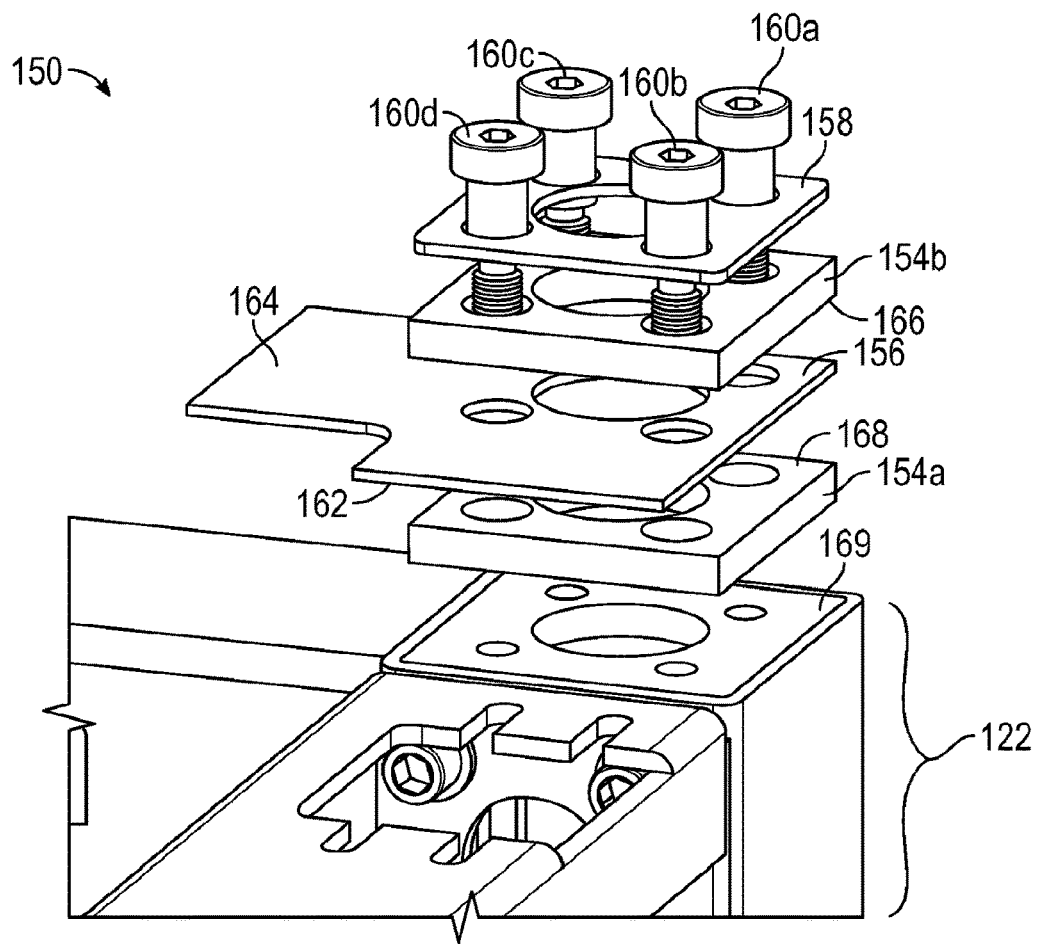
FIG. 7A illustrates a damper for mounting the damper frame to the z-stage frame, in accordance with an aspect of the present disclosure.
Figure 7B:
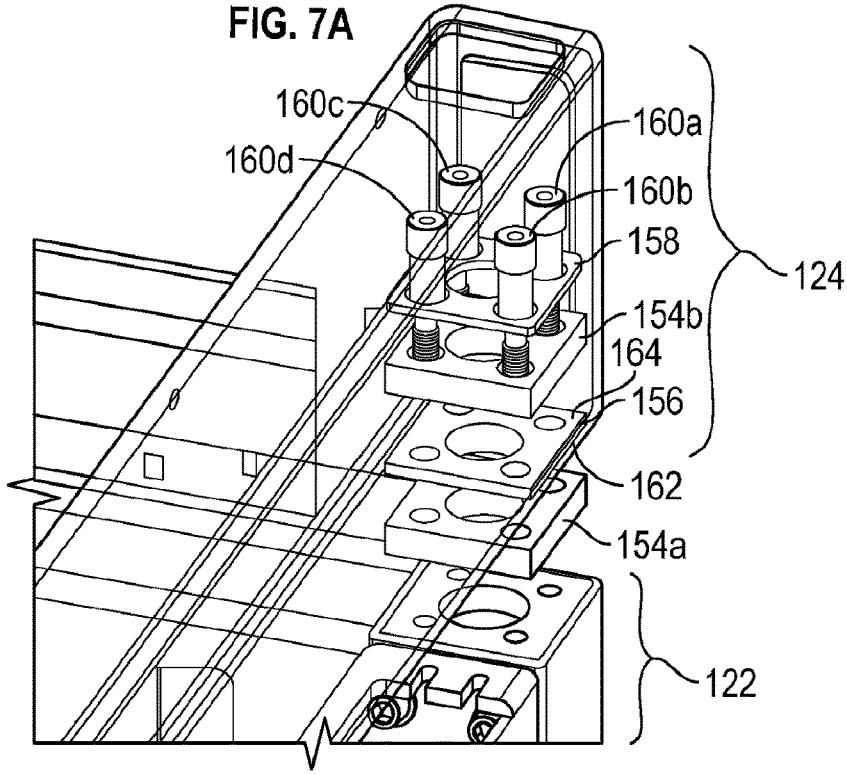
FIG. 7B illustrates a close up of the damper as positioned relative to the damper frame, which is illustrated in transparent, in accordance with an aspect of the present disclosure.
Figure 7C:
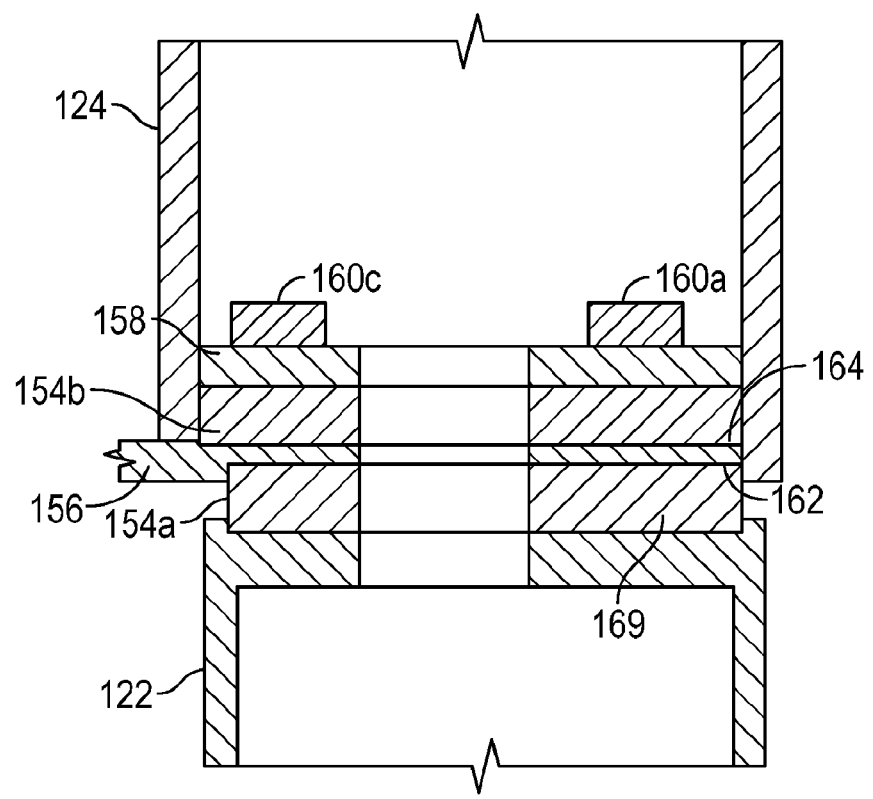
FIG. 7C is a cross-section of the damper of FIG. 7A.

The damper frame 124 is connected to the z-stage frame 122 by dampers 150*a*, 150*b* (collectively referred to herein as dampers 150) and mounts 152*a*, 152*b*, 152*c* (collectively referred to herein as mounts 152). As illustrated in FIGS. 7A, 7B and 7C, the dampers 150 are placed in the corners on the rear side 135 of the printer 100" arranged between the z-stage frame and the damper frame. Further, the dampers 150 sandwich the base 156 (see FIG. 7) of the damper frame 124. It may be appreciated, however, that the dampers 150 may be placed in other locations around the z-stage frame 122 and damper frame 124. In further aspects, the dampers 150 oppose the base of a triangle defined by the mounts 152. The dampers 150 include one or more damping pads 154*a*, 154*b* (collectively referred to herein as damping pads 154) and a backing plate 158. The damping pads 154 are positioned on either side of the damper frame base 156 (see inset FIG. 7B on right, while illustrates the damper frame 124 in transparent). However, in alternative aspects, a damping pad 154*a* may be present only between the damper frame 124 and the z-stage frame 122. The damping pads 154 are formed from an energy damping, and in further aspects a vibration damping, material such as synthetic rubber, including but not limited to silicone, nitrile rubber, ethylene propylene diene monomer rubber, polychloroprene rubber, and polyether-based polyurethane polymer materials. In addition, the damping pads 154 exhibit a rectangular prism geometry as illustrated, or other geometries, such as a cylindrical geometry. The geometry and materials need not be the same, but in aspects are the same.

A backing plate 158 is stacked onto the damping pads and damper frame base 156 and mechanical fasteners 160*a*, 160*b*, 160*c*, 160*d* (collectively referred to herein as mechanical fasteners 160) are used to tie the damping pads 154, the damper frame base 156, and backing plate 158 together. In aspects, the backing plate 158 is formed of metal, or a metal alloy. The dampers 150, and specifically the damping pads 154*a*, 154*b*, are compressible and are not understood to alter the alignment achieved by the mounts 152. The damper frame base 156, in aspects, includes machined surfaces 162, 164 that form a relief in the damper frame base 156 and assume a similar geometry to the surfaces 166, 168 of the damping pads 154*a*, 154*b* to facilitate alignment. Alternatively to, or in addition to, the machined surface 164 at the lower side of the damper frame base 156, the z-stage frame 122 may include a machined surface 169 that forms a relief exhibiting the geometry of the damping pad 154 to facilitate alignment of the damping pad 154. It may be appreciated that, while only two dampers 150*a*, 150*b* are illustrated in FIG. 6 additional dampers may be provided, such as up to eight dampers. It is also noted that, in aspects, the dampers 150 do not locate the damper frame 124 to the z-stage frame 122. Due to the dampers, the alignment of the three-dimensional printer 100 is not affected by the degree of leveling of the three-dimensional printer 100.

Figure 8A:
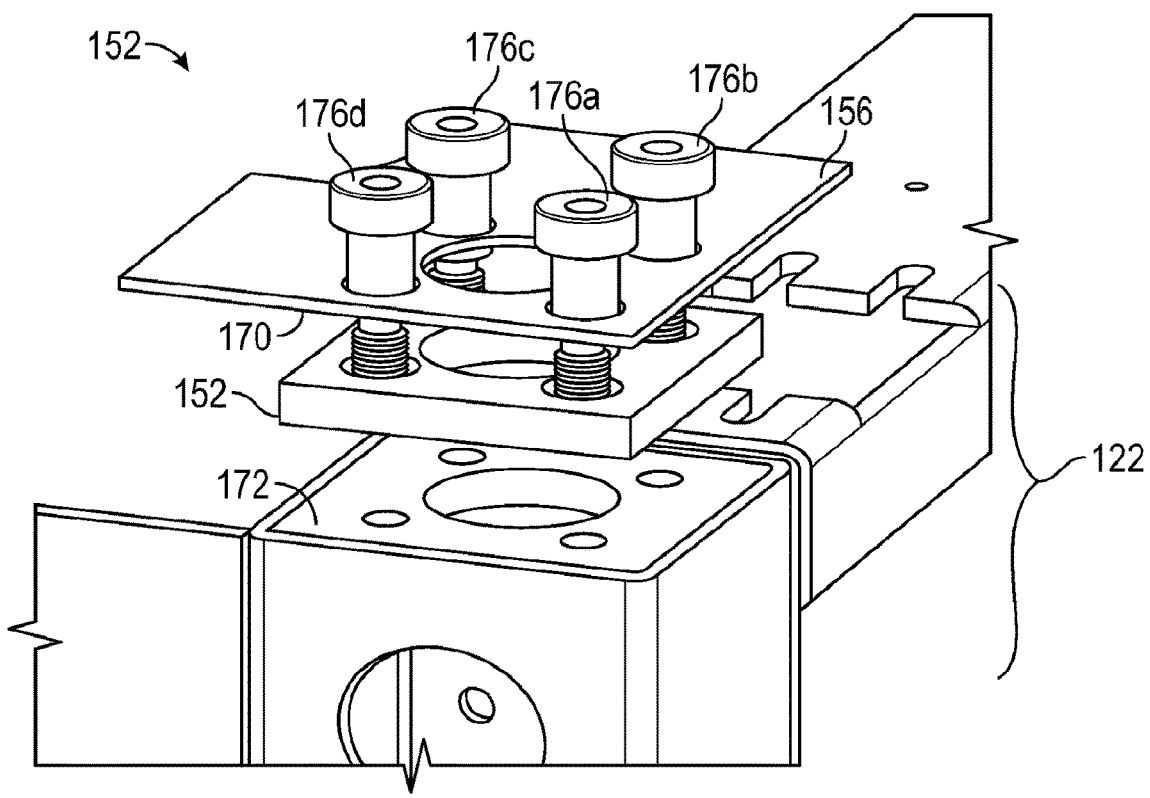
FIG. 8A illustrates a mount for mounting the damper frame to the z-stage frame, in accordance with the present disclosure.
Figure 8B:
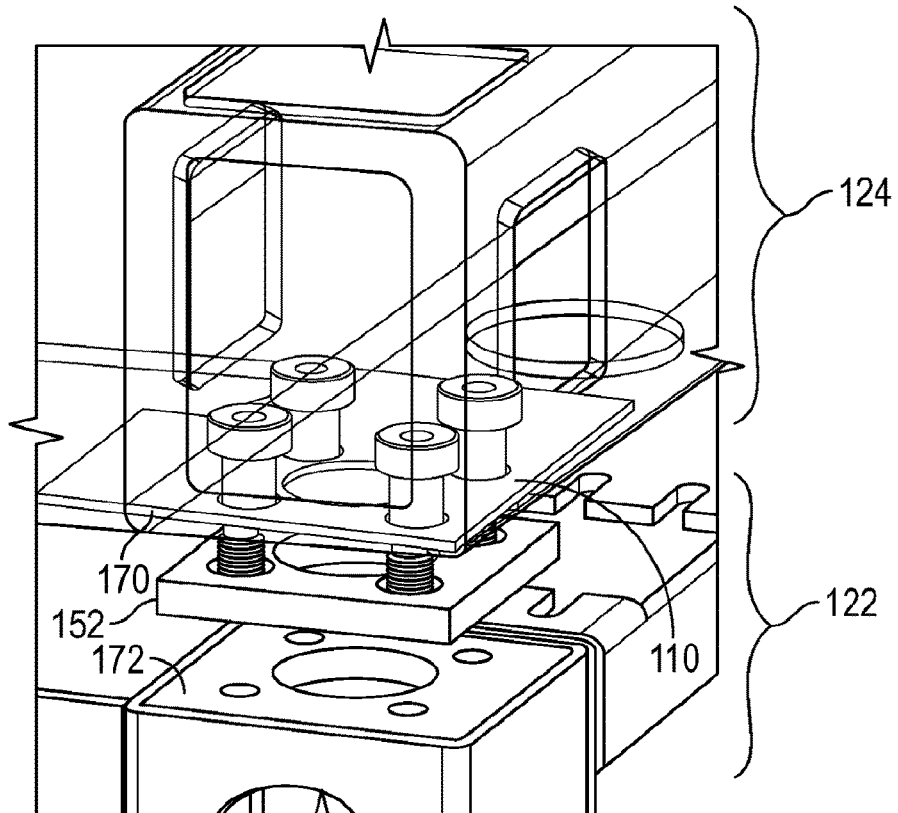
FIG. 8B illustrates a close-up of the mount as positioned relative to the damper frame, which is illustrated in transparent, in accordance with an aspect of the present disclosure.
Figure 8C:
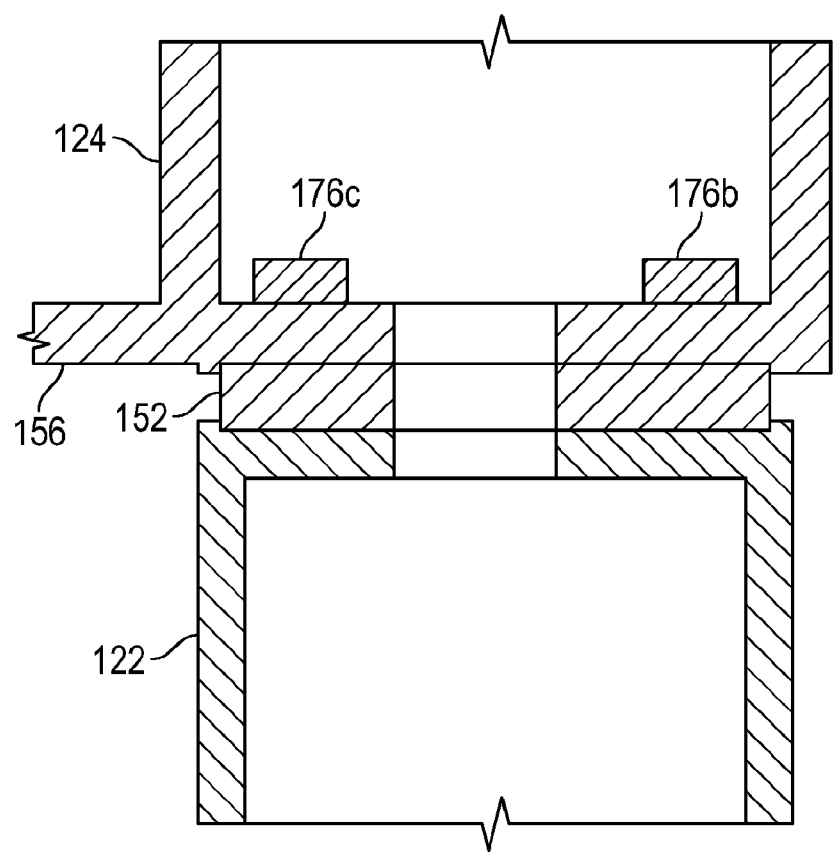
FIG. 8C is a cross-section of the mount of FIG. 8A.

FIGS. 8A, 8B and 8C illustrate an aspect of a mount 152. The mounts 152 are arranged between the z-stage frame 122 and the damper frame 124, aligning the damper frame 124 to the z-stage frame 122. The mount 152 is formed from a material that is, in aspects, relatively more rigid, or harder, than the damping pads 154. In aspects, hardness may be measured by e.g., ASTM D785-08 (2015) or other testing parameters. The mount 152 includes, for example, aluminum or a polymeric material such as an elastomer, e.g., vinylidene fluoride elastomer, polyurethane, vulcanized rubber, or other polymer materials. In particular aspects, the aluminum or polymer material mount 152 is used to facilitate alignment of the damper frame 124 to the z-stage frame 122. The damper frame 124 includes, in aspects, a machined surface 170, or a relief in the surface in the general shape of the mount 152 in which the mount 152 is received, to facilitate alignment of the mount 152 relative to the damper frame 124. In alternative, or additional, aspects a machined surface 172, forming a relief in the general shape of the mount 152, may be present on the z-stage frame 122. In aspects, the mounts 152 are aligned in a triangular pattern, as illustrated in FIG. 6, defining a base along one edge of the printer frame 120. In further aspects, the mounts 152 are placed in a triangular pattern including two congruent sides or in an equilateral triangular pattern. It may, therefore, be appreciated that the alignment of the machine may not be affected by the leveling of the machine. Mechanical fasteners 176a, 176c, 176c, 176d (hereinafter mechanical fasteners 176) are used to secure the mount 152 between the damper frame 124 and the z-stage frame 122.

Figure 9:
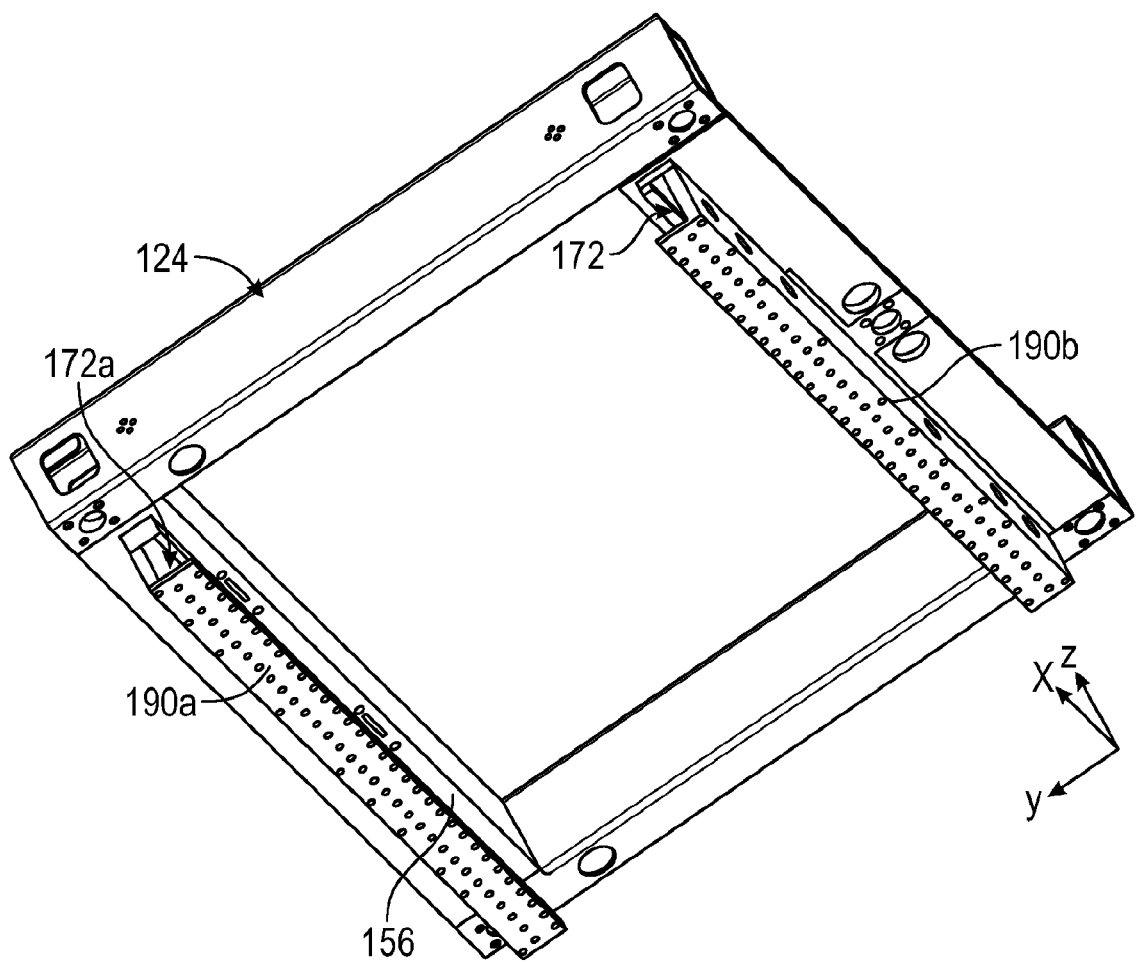
FIG. 9 illustrates the print head rails mounted to the underside of the base of the damper frame, in accordance with an aspect of the present disclosure.

Turning now to FIG. 9, the print head 104, 104' is affixed to the damper frame 124 by rails 190a, 190b (hereinafter rails 190) mounted to the base 156 of the damper frame 124. In the aspect illustrated, the rails 190 run along, or are aligned in, the x-direction. In alternative aspects, the rails 190 run along, or are aligned in, the y-direction, or rails are provided that run in both the x- and y-directions. The rails 190 each define a channel 172a, 172b for receiving the print head carriage (not-illustrated).

Figure 10:
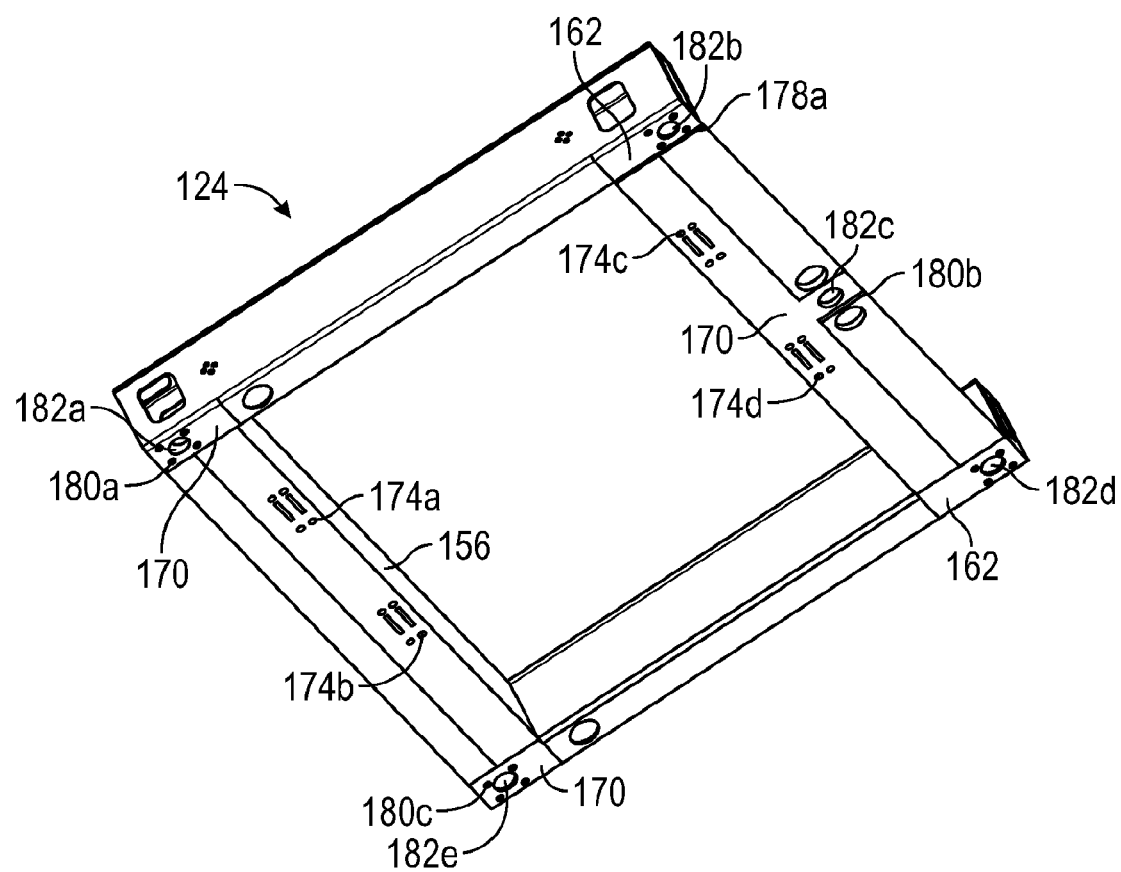
FIG. 10 illustrates the underside of the base of the damper frame, in accordance with an aspect of the present disclosure.

With reference to FIG. 10, openings 174a. 174b, 174c, 174d (collectively referred to herein as rail mount openings 174) for mounting the rails 190 are defined in the base 156 of the damper frame 124. The rail mount openings 174, in aspects, are machined at the same time the openings 178a, 178b (collectively referred to herein as 178) for the mechanical fasteners 160 securing the dampers 150 are machined as well as the openings 180a, 180b, 180c (collectively referred to herein as 180) for securing the mechanical fasteners 176 for securing the mounts 152 are machined. It should be appreciated that each set of openings 174, 178, 180 includes from 1 to 4 openings for the fasteners 160, 176. Additional features may be formed at this time, such as relief openings 182a, 182b, 182c, 182d, 182e under each mount 152 and each damper 150. Further, the machined surfaces 162, 164, 170 may be formed at this time. Forming these features, i.e., the rail mount openings 174, the openings 178 for securing the damper mechanical fasteners 160, the openings 180 for securing the mount mechanical fasteners 176, the relief openings 182, and the machined surfaces 162, 164, 170, may improve accuracy with a single set-up for machining, which may also improve costs, reduce production time and reduce the number of fixtures. Further, it may be relatively easier to create machine datums for the motion hardware and mounts.

As alluded to above, in aspects, a method of mounting a damper frame 124 to a z-stage frame 122 includes arranging one or more dampers 150 between the damper frame 124 and a z-stage frame 122, arranging one or more mounts 152 between the damper frame 124 and the z-stage frame 122, and aligning the damper frame 124 with the z-stage frame 122 with the one or more mounts 152. The damper frame 124 and the mounts 152 are secured to the z-stage frame 122 with a plurality of mount mechanical fasteners 176 and the dampers 150 are secured to the damper frame 124 with a plurality of damper mechanical fasteners 160. In aspects, the damper frame 124 defines a base and a plurality of machined surfaces 162, 170 are formed in the base, prior to assembling the damper frame 124 and z-stage frame 122, for receiving the dampers 150 and the mounts 152. In addition, in aspects, a plurality of openings 178, 180 are formed for receiving the plurality of damper mechanical fasteners 160 and the plurality of mount mechanical fasteners 176 prior to assembly of the damper frame with the z-stage frame.

With reference again to FIG. 3A, in aspects, the three-dimensional printers 100", 100''' exhibit a build height, within the build volume 108", in the range of 100 mm to 700 mm, including all values and ranges therein such as from 160 mm to 650 mm, a build length, within the build volume 108", in the x direction of 400 mm to 800 mm, including all values and ranges therein such as from 460 mm to 740 mm, and a build length, within the build volume 108", in they direction of 300 mm to 550 mm, including all values and ranges therein such as from 320 mm to 510 mm. Further the three-dimensional printers, in aspects, may operate a temperatures in the range of 20° C. to 200° C., including all values and ranges therein, including maximum temperatures in the range of 100° C. to 200° C. It may be appreciated that smaller build volumes may allow for smaller overall printer size, allowing for the inclusion of more printers in a given floor space, which depending on the part, may allow for an increase in throughput.

Three-dimensional printers and three-dimensional printer frames of the present disclosure offers several advantages. These advantages include modular frame assembly allowing for interchange-ability of z-stage frames providing flexible machine design, wherein z-stage frames providing varying build heights may be interchanged with a single damper frame and vice versa. In addition, the use of the damper frame in combination with the z-stage frame reduces the complexity of alignment during assembly and reduces the influence of installation leveling on machine accuracy. Further, the use of the damper frame in combination with the z-stage frame reduces vibration transmission from x-y motion of the print head to the z-stage and build platform and, vice versa, from the build platform to the z-stage. In yet further aspects advantages include the stackability of the printers and filament carts, may provide for increased throughput.

In the claims, certain elements are designated as "first", "second", "third", and "fourth". These are arbitrary designations intended to assist in distinguishing the various elements from each other. In that sense they are not intended to limit the elements in any way and a "second" element labeled as such in the claim does not necessarily imply that both "first" element and "second" element need be present, likewise a "third" element labeled as such in the claim does not necessarily imply that a "first" element, "second" element, and "third" element need be present, and so on with the "fourth" element. Instead, the elements are distinguishable by their disposition, description, connections, and function.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A modular three-dimensional printer frame, comprising:
   a z-stage frame adapted to support a build platform;
   a damper frame connected to the z-stage frame adapted to support a print head;
   a first mount arranged between the z-stage frame and the damper frame; and a first damper arranged between the z-stage frame and the damper frame, wherein the first damper includes a first damping pad located between the damper frame and the z-stage frame and a second damping pad located between the damper frame and a backing plate.

2. The modular three-dimensional printer frame of claim 1, wherein the damper frame defines a base and the damper frame further includes at least two rails mounted to the base and a print head carriage received by the rails.

3. The modular three-dimensional printer frame of claim 1, further comprising a second mount and a third mount arranged between the z-stage frame and the damper frame; and
a second damper arranged between the damper frame and the z-stage frame.

4. The modular three-dimensional printer frame of claim 3, wherein the first mount, the second mount, and the third mount are arranged between the z-stage frame and the damper frame in a triangular pattern.

5. The modular three-dimensional printer frame of claim 3, wherein the z-stage frame defines a first opposing side, a second opposing side, a rear side, a first corner defined by the first opposing side and the rear side, and a second corner defined by the rear side and the second opposing side, including the first damper located at the first corner and the second damper located at the second corner.

6. The modular three-dimensional printer frame of claim 5, wherein the first mount is positioned between the first damper and the second damper, the second mount is positioned at a third corner opposing the first corner of the first opposing side, and a second mount is positioned at a fourth corner opposing the second corner of the second opposing side.

7. The modular three-dimensional printer frame of claim 1, wherein the first mount is one of aluminum and a polymer material.

8. The modular three-dimensional printer frame of claim 1, wherein the damper frame includes a machined surface forming a relief and the first mount is received in the relief.

9. The modular three-dimensional printer frame of claim 1, wherein the z-stage frame includes a machined surface forming a relief and the first mount is received in the relief.

10. The modular three-dimensional printer frame of claim 1, wherein the mount exhibits a first hardness and the first damping pad exhibits a second hardness wherein the first hardness is greater than the second hardness.

11. The modular three-dimensional printer frame of claim 1, wherein the z-stage frame includes a machined surface that form a relief and receives the first damping pad.

12. The modular three-dimensional printer frame of claim 1, wherein the first and second damping pads are formed of synthetic rubber.

13. The modular three-dimensional printer frame of claim 1, wherein the backing plate, the first damping pad, and the second damping pad are secured to the damper frame and the z-stage frame with a plurality of mechanical fasteners.

14. The modular three-dimensional printer frame of claim 1, wherein the damper frame includes a machined surface forming a relief and receives the second damping pad.

* * * * *